US011409241B2

(12) United States Patent
Zhou et al.

(10) Patent No.: US 11,409,241 B2
(45) Date of Patent: Aug. 9, 2022

(54) METHOD AND APPARATUS FOR ADJUSTING HOLOGRAPHIC CONTENT AND COMPUTER READABLE STORAGE MEDIUM

(71) Applicant: BEIJING XIAOMI MOBILE SOFTWARE CO., LTD., Beijing (CN)

(72) Inventors: Liang Zhou, Beijing (CN); Zhiyong Feng, Beijing (CN); Jiasong Ji, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 278 days.

(21) Appl. No.: 16/654,932

(22) Filed: Oct. 16, 2019

(65) Prior Publication Data

US 2020/0125032 A1 Apr. 23, 2020

(30) Foreign Application Priority Data

Oct. 18, 2018 (CN) .......................... 201811216829.X (51) Int. Cl.
*G06T 19/00* (2011.01)
*G03H 1/22* (2006.01)
*H04N 13/106* (2018.01)
*G02B 5/32* (2006.01)
*G06T 3/00* (2006.01)

(52) U.S. Cl.
CPC ................ *G03H 1/22* (2013.01); *G02B 5/32* (2013.01); *G06T 3/00* (2013.01); *H04N 13/106* (2018.05); *G03H 2001/2273* (2013.01)

(58) Field of Classification Search
CPC ..... G06T 15/20; G06T 15/405; G06T 19/006; G06T 3/0009; G02B 27/0103; G02B 27/0179

USPC .......................... 382/103, 276; 345/619, 427
See application file for complete search history.

(56) References Cited

U.S. PATENT DOCUMENTS

| 9,430,038 B2 | 8/2016 | Ebstyne et al. |
| 2015/0244747 A1 | 8/2015 | Wickenkamp et al. |
| 2017/0243324 A1* | 8/2017 | Mierle .................... G06T 11/60 |
| 2017/0363867 A1* | 12/2017 | Poulos ............... G02B 27/0172 |
| 2018/0203410 A1 | 7/2018 | Kline et al. |
| 2018/0224802 A1* | 8/2018 | Vasavada ................. G09B 5/02 |

(Continued)

FOREIGN PATENT DOCUMENTS

| CN | 104601980 A | 5/2015 |
| CN | 106097435 A | 11/2016 |
| CN | 106710002 A | 5/2017 |

(Continued)

OTHER PUBLICATIONS

European Patent Office, Extended European Search Report Issued in Application No. 19204085.5, dated Apr. 14, 2020, Germany, 8 pages.

*Primary Examiner* — Audrey Y Chang
(74) *Attorney, Agent, or Firm* — Syncoda LLC; Feng Ma (57) ABSTRACT

A method for adjusting a holographic content includes: a pose of an electronic device and a pose of a holographic content are obtained respectively under a current spatial coordinate system; difference information between the pose of the electronic device and the pose of the holographic content is obtained; and the pose of the holographic content is adjusted if it is determined that the pose of the holographic content is to be adjusted based on the difference information.

9 Claims, 9 Drawing Sheets

(56) References Cited

U.S. PATENT DOCUMENTS

2019/0206037 A1    7/2019   Wu et al.

FOREIGN PATENT DOCUMENTS

| CN | 106951262 A | 7/2017 |
| CN | 107358656 A | 11/2017 |
| CN | 107958479 A | 4/2018 |
| CN | 108021241 A | 5/2018 |
| WO | 2018077206 A1 | 5/2018 |

* cited by examiner

METHOD AND APPARATUS FOR ADJUSTING HOLOGRAPHIC CONTENT AND COMPUTER READABLE STORAGE MEDIUM

CROSS-REFERENCE TO RELATED APPLICATIONS

This application claims priority to Chinese Patent Application No. 201811216829.X filed on Oct. 18, 2018, the disclosure of which is hereby incorporated by reference in its entirety.

BACKGROUND

Augmented Reality (AR) or Mixed Reality (MR) glasses are becoming a next-generation mobile computing displaying platform. At present, many large manufacturers in this industry are carrying out hardware development. Compared with a mobile phone, intelligent glasses can bring significantly differential content display capabilities to users. Such differential content display capabilities can originate from: 1) a larger display field-of-view to fill up a larger area within a field of view of a user; 2) binocular stereoscopic display and hand-free display to comply with visual characteristics of users and more realistically present contents.

SUMMARY

The present disclosure relates generally to the field of communication technologies, and more specifically to a method and an apparatus for adjusting a holographic content, and a computer-readable storage medium.

Various embodiments of the present disclosure provide a method and an apparatus for adjusting a holographic content.

According to a first aspect of the present disclosure, there is provided a method of adjusting a holographic content, including: obtaining a pose of an electronic device and a pose of a holographic content respectively under a current spatial coordinate system; obtaining difference information between the pose of the electronic device and the pose of the holographic content; and adjusting the pose of the holographic content if it is determined that the pose of the holographic content is to be adjusted based on the difference information.

According to a second aspect of the present disclosure, there is provided an apparatus for adjusting a holographic content. The apparatus includes: a first obtaining module, configured to obtain a pose of an electronic device and a pose of a holographic content respectively under a current spatial coordinate system; a second obtaining module, configured to obtain difference information between the pose of the electronic device and the pose of the holographic content; and a determining adjusting module, configured to adjust the pose of the holographic content if it is determined that the pose of the holographic content is to be adjusted based on the difference information.

According to a third aspect of the present disclosure, there is provided an apparatus for adjusting a holographic content. The apparatus includes: a processor and a memory configured to store processor-executable instructions. When the processor-executable instructions are invoked, the processor is configured to: obtain a pose of an electronic device and a pose of a holographic content respectively under a current spatial coordinate system; obtain difference information between the pose of the electronic device and the pose of the holographic content; and adjust the pose of the holographic content if it is determined that the pose of the holographic content is to be adjusted based on the difference information.

According to a fourth aspect of the present disclosure, there is provided a non-volatile computer-readable storage medium storing computer instructions. The computer instructions are executed by a processor, the processor is caused to perform following operations comprising: obtaining a pose of an electronic device and a pose of a holographic content respectively under a current spatial coordinate system; obtaining difference information between the pose of the electronic device and the pose of the holographic content; and adjusting the pose of the holographic content when it is determined that the pose of the holographic content is to be adjusted based on the difference information.

It is to be understood that the above general descriptions and the subsequent detailed descriptions are merely illustrative and explanatory and are not intended to limit the present disclosure.

BRIEF DESCRIPTION OF DRAWINGS

The accompanying drawings, which are incorporated in and constitute a part of the present disclosure, illustrate examples consistent with the present disclosure and serve to explain the principles of the present disclosure together with the description.

DETAILED DESCRIPTION

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are merely examples of an apparatus and a method consistent with some aspects of the present disclosure described in detail in the appended claims.

A three-dimension (3D) holographic content is a new content collection and presentation technology which can more realistically reproduce a real 3D geometry and light information of a collected object than an ordinary two-dimension (2D) content. This technology is especially applicable to collecting a dynamic real person. In recent years, with development of holographic collection hardware, and reconstruction or compression software, fabrication and propagation of holographic contents become more convenient. However, often the holographic content cannot be correspondingly adjusted in pose based on a change of a relative position of a photographing device.

Figure 1:
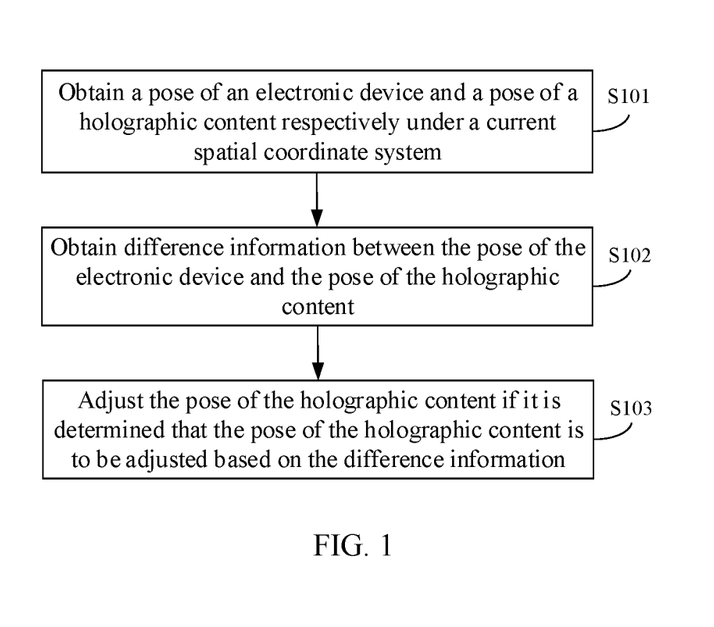
FIG. 1 is a flowchart illustrating a method of adjusting a holographic content according to an example of the present disclosure.

FIG. 1 is a flowchart illustrating a method of adjusting a holographic content according to an example of the present disclosure. As shown in FIG. 1, the method of adjusting a holographic content may be applied to an electronic device. The electronic device may include but not limited to an intelligent device such as intelligent glasses and an AR mobile phone. The method of adjusting a holographic content includes the following blocks S101-S103.

At block S101, a pose of an electronic device and a pose of a holographic content are obtained respectively under a current spatial coordinate system.

The pose can include, for example, position and attitude. The position can include, for example, coordinates in a three-dimensional (3D) space measured by sensors such as optical sensors (e.g., cameras), positioning systems such as the global positioning system (GPS), wireless network such as Wi-Fi or cellular network, etc. The attitude can include, for example, yaw, roll, and pitch measured by an attitude sensor such as a gyroscopic sensor, a micro-electromechanical (MEMS) sensor, an accelerometer, etc.

The current spatial coordinate system may be a camera spatial coordinate system of the electronic device.

In some embodiments, before performing block S101, the method further includes: detecting whether a second visual sensor in the electronic device is enabled; if yes, obtaining the pose of the electronic device and the pose of the holographic content respectively under the current spatial coordinate system. For example, by taking an AR device as an example, it is detected that whether a camera in the AR device is enabled. After it is detected that the camera in the AR device is enabled, the pose of the AR device and the pose of the holographic content are obtained respectively under the current spatial coordinate system.

The origin of the current spatial coordinate system is a position where the electronic device, for example, the AR device, is enabled.

In some examples, the pose of the electronic device, for example, the AR device, i.e. ($x_{camera}$, $y_{camera}$, $z_{camera}$, $yaw_{camera}$, $roll_{camera}$, $pitch_{camera}$) and the pose of the holographic content, i.e. ($x_{holo}$, $y_{holo}$, $z_{holo}$, $yaw_{holo}$, $roll_{holo}$, $pitch_{holo}$) may be obtained in real time at six dimensions of the current spatial coordinate system.

As above, yaw refers to a yaw angle, roll refers to a roll angle, and pitch refers to a pitch angle.

At block S102, difference information between the pose of the electronic device and the pose of the holographic content is obtained.

The difference information between the pose of the electronic device and the pose of the holographic content may be obtained by obtaining differences of poses at six dimensions.

At block S103, the pose of the holographic content is adjusted if it is determined that the pose of the holographic content is to be adjusted based on the difference information.

In some examples, if it is determined that a display region of the holographic content exceeds a preset range based on the difference information, it is determined the pose of the holographic content is to be adjusted. For example, if a holographic person is locally or wholly outside a photo preview window, it is determined that the pose of the holographic content is to be adjusted.

The fact that the display region of the holographic content exceeds the preset range may be determined in many manners. For example, if the difference information indicates that an absolute value of a difference at any dimension of the current spatial coordinate system is greater than a preset threshold, it is determined that the display region of the holographic content exceeds the preset range. For another example, if the difference information indicates that an average difference at a plurality of dimensions of the current spatial coordinate system is greater than a preset value, it is determined that the display region of the holographic content exceeds the preset range.

The pose of the holographic content may be adjusted in several manners, for example, in the following manners.

In a first manner, the holographic content is rotated or moved based on the difference information under the current spatial coordinate system.

In a second manner, kinematic information of the electronic device under the current spatial coordinate system is determined and a holographic content matched with the kinematic information is obtained as an adjusted holographic content.

For example, if the AR device is rotated rightward by 5 degrees under the current spatial coordinate system, a holographic content video clip matched with the current kinematic information is obtained as the adjusted holographic content.

In a third manner, new feature information of the holographic content is dynamically synthesized based on skeleton information of the holographic content with a computer vision algorithm and taken as the adjusted holographic content.

The new feature information may include but not limited to new geometric features and texture features and so on.

In the above examples, the pose of the electronic device and the pose of the holographic content are obtained respectively under the current spatial coordinate system, and the difference information between the pose of the electronic device and the pose of the holographic content is obtained, and then the pose of the holographic content is adjusted. In this way, the pose of the holographic content may be adjusted correspondingly according to a change of a relative position of the electronic device.

Figure 2:
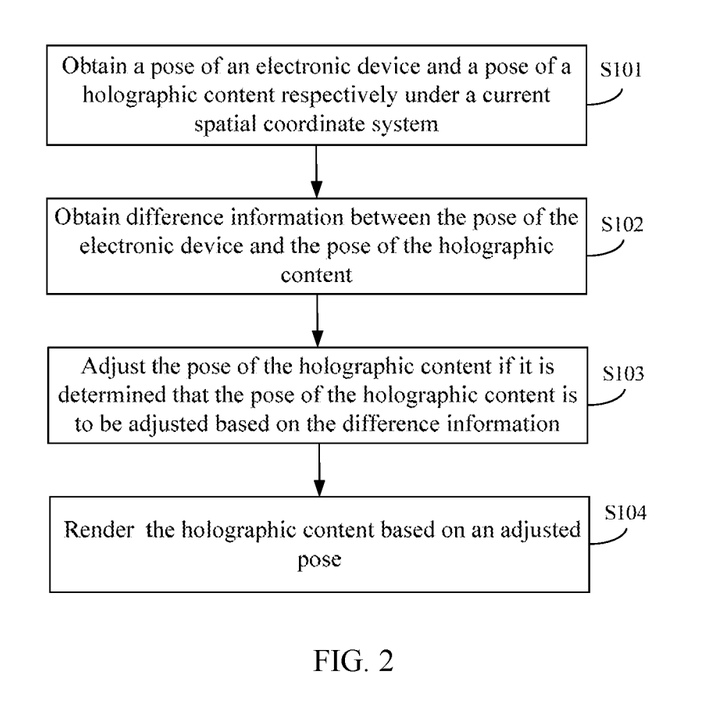
FIG. 2 is a flowchart illustrating a method of adjusting a holographic content according to another example of the present disclosure.

FIG. 2 is a flowchart illustrating a method of adjusting a holographic content according to another example of the present disclosure. As shown in FIG. 2, after block S103, the method further includes the following block.

At block S104, the holographic content is rendered based on an adjusted pose.

In some examples, after the pose of the holographic content is adjusted based on the difference information, a corresponding holographic content may be rendered based on the adjusted pose to produce a real-time preview effect.

In some examples, the electronic device may obtain a rendered holographic content by rendering the holographic content based on the adjusted pose.

Figure 3:
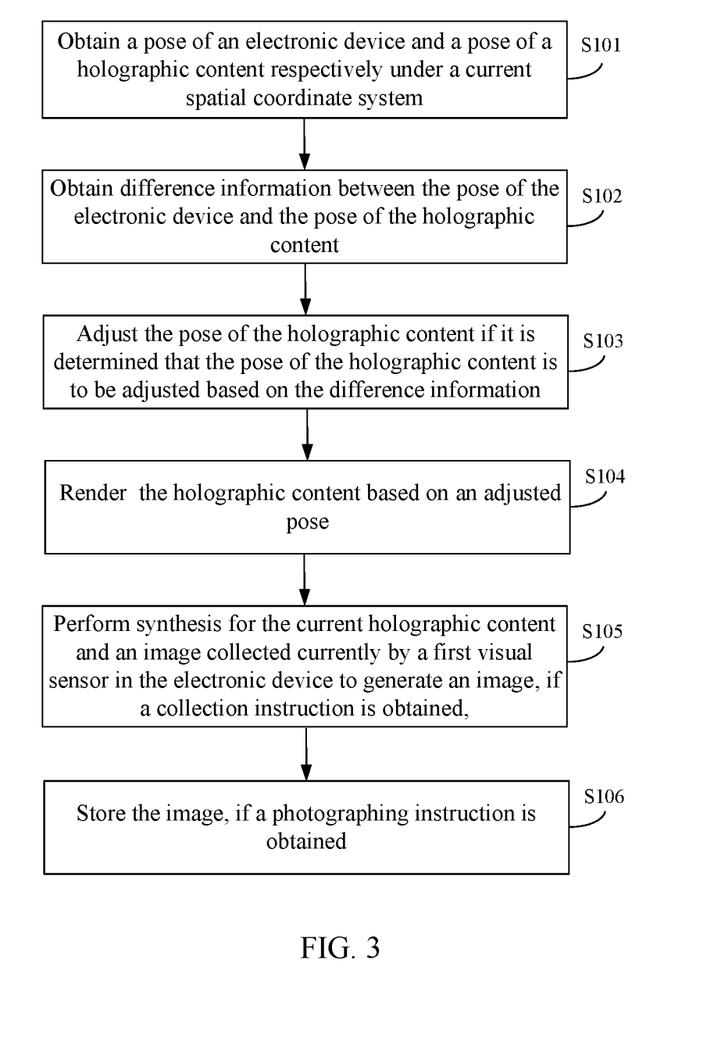
FIG. 3 is a flowchart illustrating a method of adjusting a holographic content according to another example of the present disclosure.

FIG. 3 is a flowchart illustrating a method of adjusting a holographic content according to another example of the present disclosure. As shown in FIG. 3, after block S104, the method further includes the following block.

At block S105, if a collection instruction is obtained, synthesis is performed for the current holographic content and an image collected currently by a first visual sensor in the electronic device to generate an image.

If the first visual sensor, for example, a first camera, in the electronic device, obtains the collection instruction, image collection is started, and the current holographic content and the currently-collected image are synthesized to generate an image. In this way, a group photo may be taken for a user and a generated image.

In some examples, the current holographic content may be the rendered holographic content. At this time, if the collection instruction is obtained, synthesis is performed for the rendered holographic content and the image collected currently by the first visual sensor in the electronic device to generate an image. In this way, a group photo may be taken for the user and a generated image.

At block S106, if a photographing instruction is obtained, the image is stored.

In some examples, if a photographing instruction is obtained by a second visual sensor, for example, a second camera, in the electronic device, the generated image is stored.

In the above examples, synthesis is performed for the current holographic content and the image collected currently by the first visual sensor in the electronic device to generate an image. When the photographing instruction is obtained, the image is stored. Thus, interactive experiences between the user and the holographic content are increased.

Figure 4:
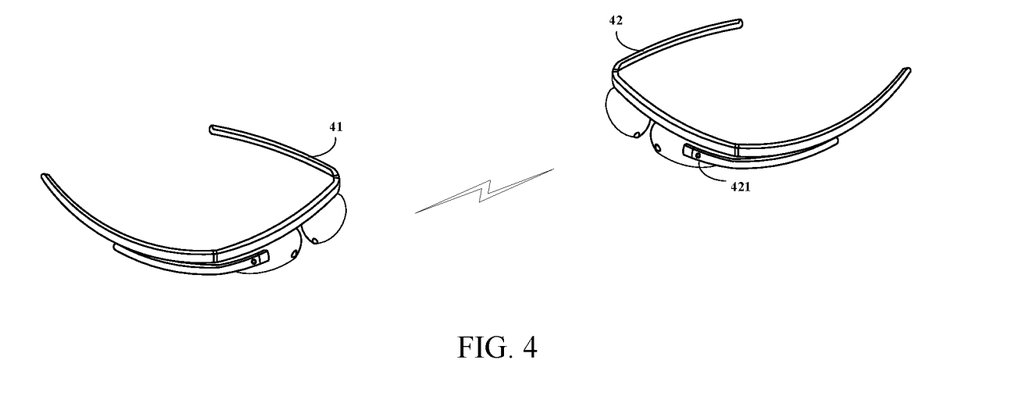
FIG. 4 is a scenario diagram illustrating a method of adjusting a holographic content according to an example of the present disclosure.

Some embodiments of the present disclosure will be illustratively described below in combination with FIG. 4. As shown in FIG. 4, a visitor A wearing first AR glasses 41 visits a company and desires to take a group photo together with holographic persons at the door of the laboratory of the company. The visitor A stares in a direction of a camera 421 in second AR glasses 42. Under the current spatial coordinate system, the second AR glasses 42 may obtain the pose of the second AR glasses and the pose of the holographic person and may adjust the pose of the holographic person based on difference information therebetween, that is, the holographic person may adjust its own position and orientation based on a position and an orientation of the camera 421 to achieve an ideal group-photographing effect.

Figure 5:
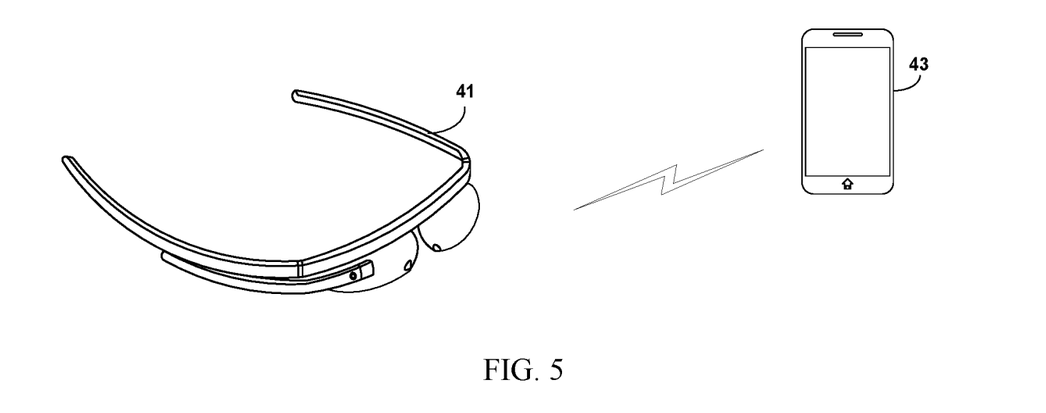
FIG. 5 is a scenario diagram illustrating a method of adjusting a holographic content according to another example of the present disclosure.

Similarly, as shown in FIG. 5, the second AR glasses 42 may be replaced with an AR mobile phone 43. That is, the group photo is taken by the AR mobile phone 43. At this time, if a camera of the AR mobile phone 43 rotates horizontally by 10 degrees, the holographic person will rotate by 10 degrees correspondingly, thereby achieving a good interaction with the visitor.

Figure 6:
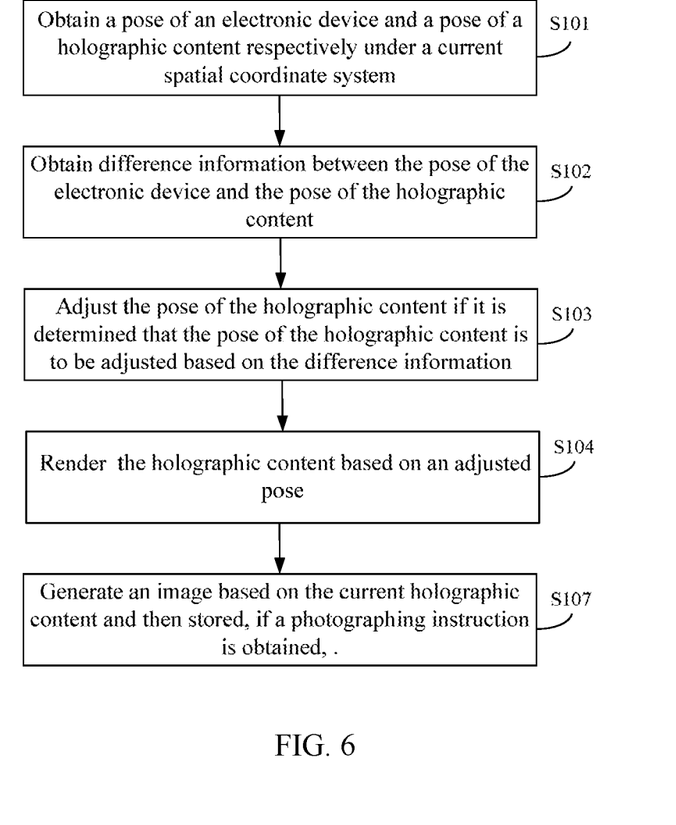
FIG. 6 is a flowchart illustrating a method of adjusting a holographic content according to another example of the present disclosure.

FIG. 6 is a flowchart illustrating a method of adjusting a holographic content according to another example of the present disclosure. As shown in FIG. 6, after block S104, the method further includes the following block.

At block S107, if a photographing instruction is obtained, an image is generated based on the current holographic content and then stored.

If the photographing instruction is obtained by the second visual sensor, for example, the second camera, in the electronic device, the image may be generated based on the current holographic content and then stored.

In some examples, the current holographic content may be the rendered holographic content. At this time, if the photographing instruction is obtained, the image is generated based on the rendered holographic content and then stored. Thus, a virtual object can be photographed.

In the above examples, the virtual object is photographed by generating the image based on the current holographic content and storing the generated image.

Corresponding to the above examples of the method of adjusting a holographic content, the present disclosure further provides an example of an apparatus for adjusting a holographic content.

Figure 7:
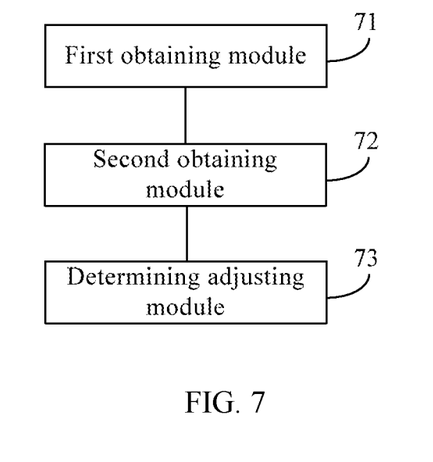
FIG. 7 is a block diagram illustrating an apparatus for adjusting a holographic content according to an example of the present disclosure.

FIG. 7 is a block diagram illustrating an apparatus for adjusting a holographic content according to an example of the present disclosure. As shown in FIG. 7, the apparatus for adjusting a holographic content may be applied to an electronic device. The electronic device may include but not limited to an intelligent device such as intelligent glasses and an AR mobile phone. The apparatus for adjusting a holographic content includes a first obtaining module 71, a second obtaining module 72 and a determining adjusting module 73.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The first obtaining module 71 is configured to obtain a pose of the electronic device and a pose of a holographic content respectively under a current spatial coordinate system.

The current spatial coordinate system may be a camera spatial coordinate system of the electronic device. The origin of the current spatial coordinate system is a position where the electronic device, for example, an AR device, is enabled.

In some examples, the pose of the electronic device, for example, the AR device, i.e., ($x_{camera}$, $y_{camera}$, $z_{camera}$, $yaw_{camera}$, $roll_{camera}$, $pitch_{camera}$) and the pose of the holographic content, i.e., ($x_{holo}$, $y_{holo}$, $z_{holo}$, $yaw_{holo}$, $roll_{holo}$, $pitch_{holo}$) may be obtained in real time at six dimensions of the current spatial coordinate system.

As above, yaw refers to a yaw angle, roll refers to a roll angle and pitch refers to a pitch angle.

The second obtaining module 72 is configured to obtain difference information between the pose of the electronic device and the pose of the holographic content.

The difference information between the pose of the electronic device and the pose of the holographic content may be obtained by obtaining differences of poses at six dimensions.

The determining adjusting module 73 is configured to adjust the pose of the holographic content when it is determined that the pose of the holographic content is to be adjusted based on the difference information.

In some embodiments, the determining adjusting module 73 is configured to determine that the pose of the holographic content is to be adjusted when it is determined that a display region of the holographic content exceeds a preset range based on the difference information. For example, if a holographic person is locally or wholly outside a photo preview window, it is determined that the pose of the holographic content is to be adjusted.

In the above examples, the pose of the electronic device and the pose of the holographic content are obtained respectively under the current spatial coordinate system, and the difference information between the pose of the electronic device and the pose of the holographic content is obtained, and then the pose of the holographic content is adjusted. In this way, the pose of the holographic content may be adjusted correspondingly according to a change of a relative position of the electronic device.

Figure 8:
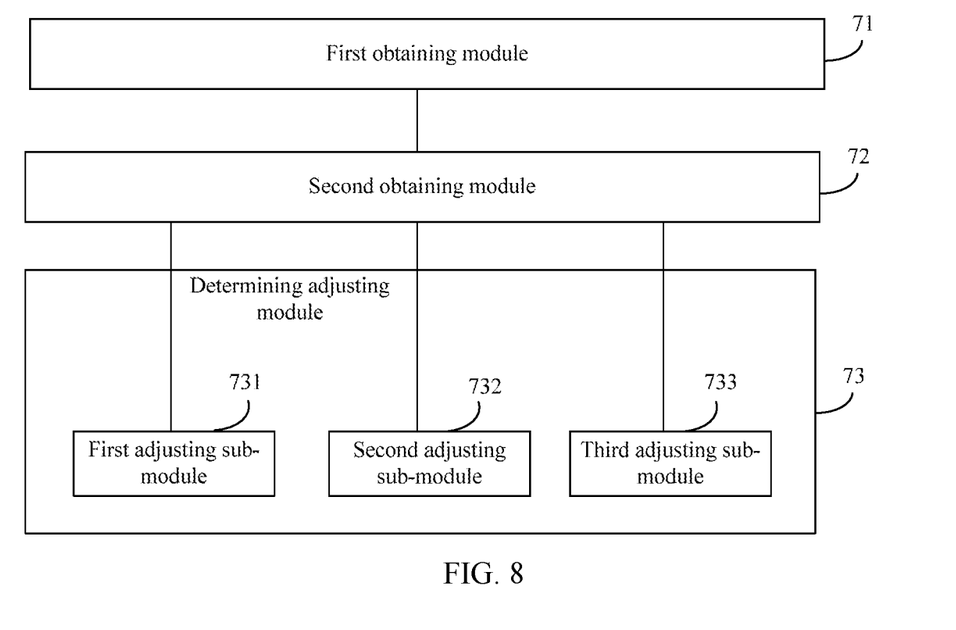
FIG. 8 is a block diagram illustrating an apparatus for adjusting a holographic content according to another example of the present disclosure.

FIG. 8 is a block diagram illustrating an apparatus for adjusting a holographic content according to another example of the present disclosure. As shown in FIG. 8, the determining adjusting module 73 includes: a first adjusting sub-module 731, a second adjusting sub-module 732 and a third adjusting sub-module 733.

The first adjusting sub-module 731 is configured to rotate or move the holographic content based on the difference information under the current spatial coordinate system.

The second adjusting sub-module 732 is configured to determine kinematic information of the electronic device under the current spatial coordinate system and obtain a holographic content matched with the kinematic information as an adjusted holographic content.

For example, if the AR device rotates rightward by 5 degrees under the current spatial coordinate system, a holographic content video clip matched with the current kinematic information is obtained as the adjusted holographic content.

The third adjusting sub-module 731 is configured to synthesize new feature information of the holographic content dynamically based on skeleton information of the holographic content with a computer vision algorithm and take the new feature information as the adjusted holographic content.

The new feature information may include but not limited to new geometric features and texture features and so on.

In the above examples, the pose of the holographic content may be adjusted flexibly in several manners.

Figure 9:
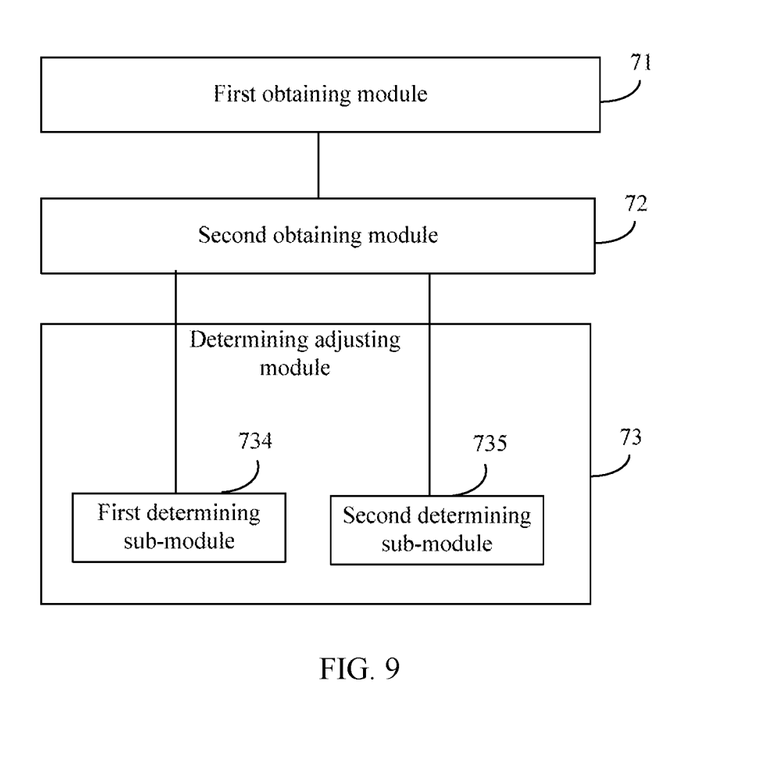
FIG. 9 is a block diagram illustrating an apparatus for adjusting a holographic content according to another example of the present disclosure.

FIG. 9 is a block diagram illustrating an apparatus for adjusting a holographic content according to another example of the present disclosure. As shown in FIG. 9, the determining adjusting module 73 includes: a first determining sub-module 734 or a second determining sub-module 735.

The first determining sub-module 734 is configured to determine that the display region of the holographic content exceeds the preset range when the difference information indicates that an absolute value of a difference at any dimension of the current spatial coordinate system is greater than a preset threshold.

The second determining sub-module 735 is configured to determine that the display region of the holographic content exceeds the preset range when the difference information indicates that an average difference at a plurality of dimensions of the current spatial coordinate system is greater than a preset value.

In the above examples, the fact that the display region of the holographic content exceeds the preset range may be determined flexibly in several manners.

Figure 10:
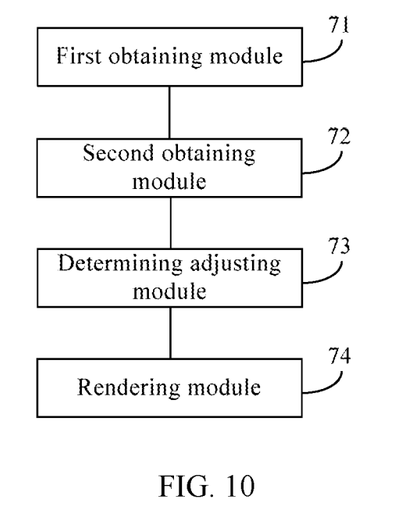
FIG. 10 is a block diagram illustrating an apparatus for adjusting a holographic content according to another example of the present disclosure.

FIG. 10 is a block diagram illustrating an apparatus for adjusting a holographic content according to another example of the present disclosure. As shown in FIG. 10, the apparatus further includes: a rendering module 74.

The rendering module 74 is configured to render the holographic content based on an adjusted pose.

In some embodiments, the rendering module 74 is configured to obtain a rendered holographic content by rendering the holographic content based on an adjusted pose.

In the above examples, a real-time preview effect can be achieved by rendering a corresponding holographic content based on the adjusted pose.

Figure 11:
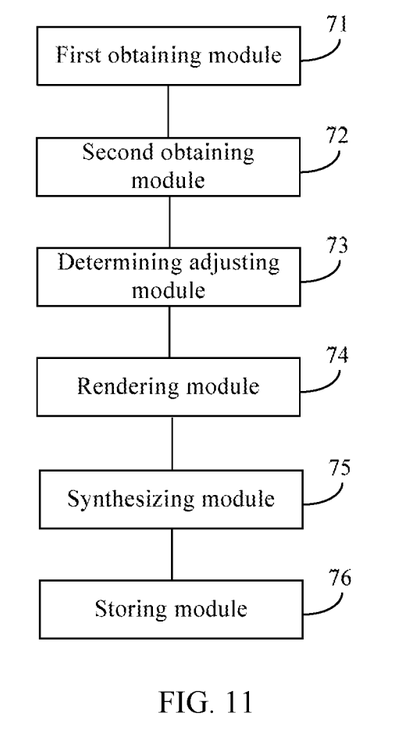
FIG. 11 is a block diagram illustrating an apparatus for adjusting a holographic content according to another example of the present disclosure.

FIG. 11 is a block diagram illustrating an apparatus for adjusting a holographic content according to another example of the present disclosure. As shown in FIG. 11, the apparatus further includes a synthesizing module 75 and a storing module 76.

The synthesizing module 75 is configured to synthesize the current holographic content and an image currently collected by a first visual sensor in the electronic device to generate an image when a collection instruction is obtained.

If the first visual sensor, for example, a first camera, in the electronic device, obtains the collection instruction, the image collection is started, and synthesis is performed for the current holographic content and the currently-collected image to generate an image. In this way, a group photo may be taken for the user, the current holographic content and the currently-collected image.

In some embodiments, the current holographic content may be a rendered holographic content. At this time, the synthesizing module 75 is configured to synthesize the rendered holographic content and an image currently collected by a first visual sensor in the electronic device to generate an image when a collection instruction is obtained.

The storing module 76 is configured to store the generated image when a photographing instruction is obtained.

In the example, if the photographing instruction is obtained by a second visual sensor, for example, a second camera, in the electronic device, the generated image is stored.

In the above examples, synthesis is performed for the current holographic content and the image collected currently by the first visual sensor in the electronic device to generate an image. When the photographing instruction is obtained, the image is stored. Thus, interactive experiences between the user and the holographic content are increased.

Figure 12:
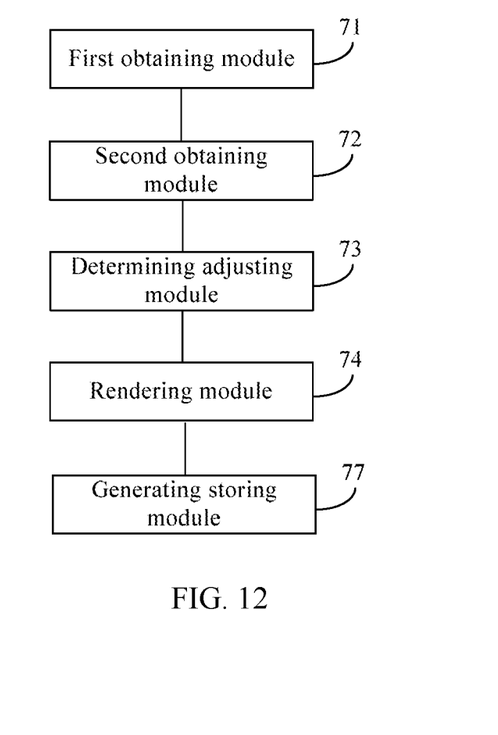
FIG. 12 is a block diagram illustrating an apparatus for adjusting a holographic content according to another example of the present disclosure.

FIG. 12 is a block diagram illustrating an apparatus for adjusting a holographic content according to another example of the present disclosure. As shown in FIG. 12, the apparatus further includes a generating storing module 77.

The generating storing module 77 is configured to generate an image based on the current holographic content when a photographing instruction is obtained, and store the image.

In some embodiments, the current holographic content may be a rendered holographic content. At this time, the generating storing module 77 is configured to generate an image based on the rendered holographic content when a photographing instruction is obtained, and store the image.

In the above examples, a virtual object can be photographed by generating an image based on the current holographic content and storing the generated image.

Figure 13:
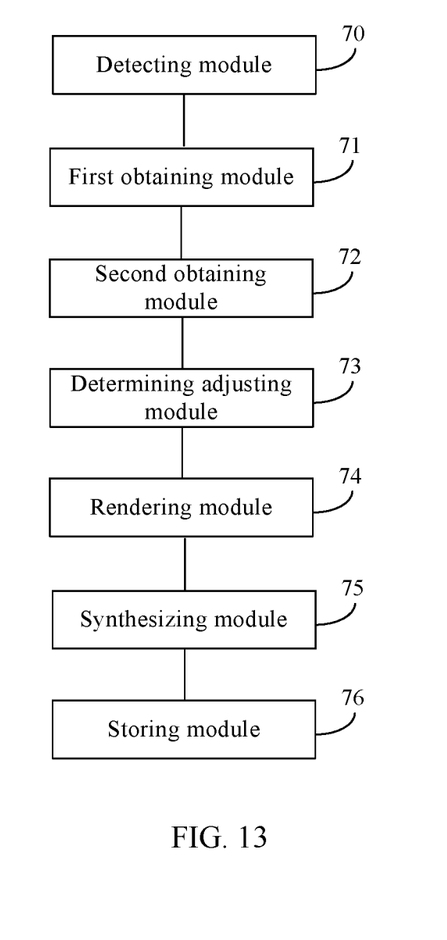
FIG. 13 is a block diagram illustrating an apparatus for adjusting a holographic content according to another example of the present disclosure.

FIG. 13 is a block diagram illustrating an apparatus for adjusting a holographic content according to another example of the present disclosure. As shown in FIG. 13, the apparatus further includes a detecting module 70.

The detecting module 70 is configured to detect whether the second visual sensor in the electronic device is enabled, and obtain the pose of the electronic device and the pose of the holographic content respectively under the current spatial coordinate system if the second visual sensor in the electronic device is enabled.

Further, a detecting module may also be included in the FIG. 12 but not shown in the FIG. 12.

In the above examples, the pose of the electronic device and the pose of the holographic content are respectively obtained under the current spatial coordinate system by detecting that the second visual sensor in the electronic device is enabled. That is, a trigger condition is provided for subsequently obtaining the pose of the electronic device and the pose of the holographic content.

The specific manner of performing operations by different modules and sub-modules in the apparatus of the above examples are already detailed in relevant examples of the method and therefore will not be repeated herein.

Figure 14:
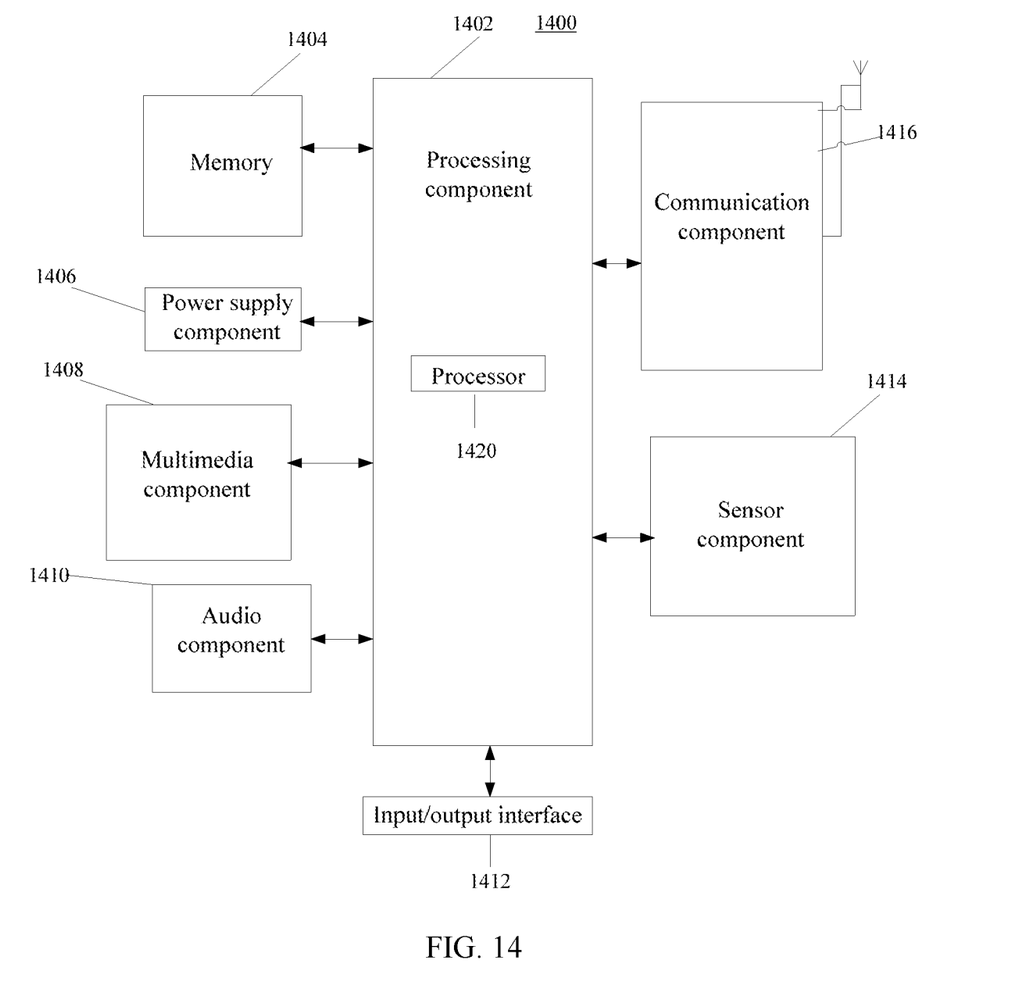
FIG. 14 is a schematic diagram illustrating a hardware structure of an electronic device according to an example of the present disclosure.

FIG. 14 is a schematic diagram illustrating a hardware structure of an electronic device according to an example of the present disclosure. For example, the apparatus 1400 may be a mobile phone, a computer, a digital broadcast terminal, a message transceiver, a game console, a tablet device, a medical device, a fitness device, a personal digital assistant, and intelligent glasses and so on.

As shown in FIG. 14, the apparatus 1400 may include one or more of a processing component 1402, a memory 1404, a power supply component 1406, a multimedia component 1408, an audio component 1410, an input/output (I/O) interface 1412, a sensor component 1414 and a communication component 1416.

The processing component 1402 generally controls the overall operation of the apparatus 1400, such as operations associated with display, phone call, data communication, camera operation, and recording operations. The processing component 1402 may include one or more processors 1420 to execute instructions to complete all or a part of the blocks of the above method. In addition, the processing component 1402 may include one or more modules to facilitate the interaction between the processing component 1402 and other components. For example, the processing component 1402 may include a multimedia module to facilitate the interaction between the multimedia component 1408 and the processing component 1402.

The memory 1404 is configured to store different types of data to support operation at the apparatus 1400. Examples of such data include instructions, contact data, phonebook data, messages, pictures, videos, and so on for any application or method that operates on the apparatus 1400. The memory 1404 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 1406 may provide power for different components of the apparatus 1400. The power supply component 1406 may include a power supply management system, one or more power sources, and other components associated with generating, managing and distributing power for the apparatus 1400.

The multimedia component 1408 includes a screen providing an output interface between the apparatus 1400 and a user. In some examples, the screen may include a Liquid-Crystal Display (LCD) and/or a Touch Panel (TP). In some embodiments, other types of displays, such as organic light-emitting diode (OLED) displays, can be adopted.

If the screen includes a touch panel, the screen may be implemented as a touch screen to receive an input signal from a user. The touch panel includes one or more touch sensors to sense touch, slip and gestures on the touch panel. The touch sensor may not only sense the boundary of a touch or slip operation but also detect duration and pressure relating to the touch or slip operation. In some examples, the multimedia component 1408 may include a front-facing camera and/or a rear camera. When the apparatus 1400 is in an operating mode, such as in a shooting mode or a video mode, the front-facing camera and/or the rear camera may receive external multimedia data. Each of the front-facing camera and the rear camera may be a fixed optical lens system or may be capable of focal length and optical zoom.

The audio component 1410 is configured to output and/or input an audio signal. For example, the audio component 1410 includes a microphone (MIC). When the apparatus 1400 is in an operating mode, for example, in a call mode, a recording mode or a speech recognition mode, the microphone is configured to receive an external audio signal. The received audio signal may be further stored in the memory 1404 or sent via the communication component 1416. In some examples, the audio component 1410 also includes a speaker for outputting an audio signal.

The I/O interface 1412 provides an interface between the processing component 1402 and a peripheral interface module. The peripheral interface module may be a keyboard, click wheel, a button and the like. Such buttons may include but not limited to: a home button, a volume button, a start button and a lock button.

The sensor component 1414 includes one or more sensors for evaluating states of the apparatus 1400 in different aspects. For example, the sensor component 1414 may detect the on/off state of the apparatus 1400, and relative locations of components, for example, the component is a display and a keypad of the apparatus 1400. The sensor component 1414 may also detect a position change of the apparatus 1400 or one component of the apparatus 1400, the presence or absence of contact of a user with the apparatus 1400, an orientation or acceleration/deceleration of the apparatus 1400 and a temperature change of the apparatus 1400. The sensor component 1414 may include a proximity sensor configured to detect presence of a nearby object without any physical contact. The sensor component 1414 may also include an optical sensor, such as a CMOS or CCD image sensor to be used in imaging application. In some examples, the sensor component 1414 may also include an acceleration sensor, a gyroscope sensor, a magnetic sensor, a pressure sensor, or a temperature sensor.

The communication component 1416 is configured to facilitate wired or wireless communication between the apparatus 1400 and other devices. The apparatus 1400 may access a wireless network based on a communication standard, such as WIFI, 2G or 3G, or a combination thereof. In an example, the communication component 1416 may receive a broadcast signal or broadcast-related information from an external broadcast management system via a broadcast channel. In an example, the communication component 1416 may also include a Near Field Communication (NFC) module to facilitate short-range communications. For example, the NFC module may be implemented based on Radio Frequency Identification (RFID) technology, Infrared Data Association (IrDA) technology, Ultra Wide Band (UWB) technology, Bluetooth (BT) technology and other technology.

In an example, the apparatus 1400 may be implemented by one or more of an Application-Specific Integrated Circuit (ASIC), a Digital Signal Processor (DSP), a Digital Signal Processing Device (DSPD), a Programmable Logical Device (PLD), a Field Programmable Gate Array (FPGA), a controller, a microcontroller, a microprocessor or other electronic elements to perform the above method.

In an example, there is provided a non-transitory computer-readable storage medium storing instructions, for example, a memory 1404 storing instructions. The above instructions may be executed by the processor 1420 of the apparatus 1400 to perform the above method. For example, the non-transitory computer-readable storage medium may a Read-Only Memory (ROM), Random-Access Memory (RAM), a CD-ROM, a magnetic tape, a floppy disk, and an optical data storage device and so on.

In some embodiments, there is also provided a computer-readable storage medium, which can be a non-transitory computer-readable storage medium having stored therein a computer program, when the stored computer program is executed by a processing circuit or processor, the operation methods provided by the above embodiments of the present application can be implemented.

In some embodiments, there is also provided a computer program product, wherein at least one instruction, at least one program, a code set, or an instruction set is stored in the program product. The at least one instruction, the at least one program, the code set, or the instruction set instructions is loaded and executed by the processor to implement the operation methods described above.

It should be understood that "a plurality" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on," a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

Implementations of the subject matter and the operations described in this disclosure can be implemented with hardware such as digital electronic circuitry or processing circuits, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded or stored on one or more non-transitory computer-readable storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method of adjusting a holographic content, applied to an electronic device that is an Augmented Reality (AR) mobile phone or AR glasses, the method comprising:
    obtaining a pose of the electronic device, and a pose of a holographic content respectively under a current spatial coordinate system, wherein an origin of the current spatial coordinate system is a position where the electronic device is enabled, the pose of the electronic device comprises values of the electronic device at six dimensions of the current spatial coordinate system and is measured by position sensor and an attitude sensor of the electronic device, the pose of the holographic content comprises values of the holographic content at the six dimensions of the current spatial coordinate system, and the six dimensions comprises three-dimensional coordinates, a yaw angle, a roll angle, and a pitch angle;
    obtaining difference information between a display area of a display screen of the electronic device determined based on the pose of the electronic device and the pose of the holographic content;
    adjusting the pose of the holographic content so that the holographic content is within the display area of the display screen of the electronic device when the difference information indicates that an average difference at a plurality of dimensions of the current spatial coordinate system is greater than a preset value;
    obtaining a rendered holographic content by rendering the holographic content based on an adjusted pose;
    upon obtaining a collection instruction, synthesizing the rendered holographic content and a real-world image currently collected by a first visual sensor in the electronic device to generate an image; and
    upon obtaining a photographing instruction, storing the generated image.

2. The method according to claim 1, wherein the adjusting the pose of the holographic content comprises:
    rotating or moving the holographic content based on a rotation and a movement of the electronic device under the current spatial coordinate system.

3. The method according to claim 1, wherein the adjusting the pose of the holographic content comprises:
    determining kinematic information of the electronic device under the current spatial coordinate system; and
    obtaining a holographic content matched with the kinematic information as an adjusted holographic content.

4. The method according to claim 1, further comprising:
    detecting whether a second visual sensor in the electronic device is enabled; and
    upon the second visual sensor in the electronic device being enabled, obtaining the pose of the electronic device and the pose of the holographic content respectively under the current spatial coordinate system.

5. An electronic device, wherein the electronic device is an Augmented Reality (AR) mobile phone or AR glasses comprising:
    a processor; and
    a memory storing processor-executable instructions;
    wherein when the processor-executable instructions are invoked, the processor is configured to:
    obtain a pose of the electronic device and a pose of a holographic content respectively under a current spatial coordinate system, wherein an origin of the current spatial coordinate system is a position where the electronic device is enabled, the pose of the electronic device comprises values of the electronic device at six dimensions of the current spatial coordinate system and is measured by a position sensor and an attitude sensor of the electronic device, the pose of the holographic content comprises values of the holographic content at the six dimensions of the current spatial coordinate system, and the six dimensions comprises three-dimensional coordinates, a yaw angle, a roll angle, and a pitch angle;
    obtain difference information between a display area of a diplay screen of the electronic device determined based on the pose of the electronic device and the pose of the holographic content;
    adjust the pose of the holographic content so that the holographic content is within the display area of the display screen of the electronic device when the difference information indicates that an average difference at a plurality of dimensions of the current spatial coordinate system is greater than a preset value,
    obtaining a rendered holographic content by rendering the holographic content based on an adjusted pose;
    upon obtaining a collection instruction, synthesizing the rendered holographic content and a real-world image currently collected by a first visual sensor in the electronic device to generate an image; and
    upon obtaining a photographing instruction, storing the generated image.

6. The electronic device according to claim 5, wherein upon the pose of the holographic content being adjusted, the processor is further configured to:
    rotate or move the holographic content based on a rotation and a movement of the electronic device under the current spatial coordinate system.

7. The electronic device according to claim 5, wherein upon the pose of the holographic content being adjusted, the processor is further configured to:

determine kinematic information of the electronic device under the current spatial coordinate system; and obtain a holographic content matched with the kinematic information as an adjusted holographic content.

8. The electronic device according to claim 5, wherein the processor is further configured to:

detect whether a second visual sensor in the electronic device is enabled; and upon the second visual sensor in the electronic device being enabled, obtain the pose of the electronic device and the pose of the holographic content respectively under the current spatial coordinate system.

9. A non-transitory computer-readable storage medium storing computer instructions for execution by a processor of an electronic device to perform following operations, wherein the electronic device is an Augmented Reality (AR) mobile phone or AR glasses, the operations comprising:

obtaining a pose of the electronic device and a pose of a holographic content respectively under a current spatial coordinate system, wherein an origin of the current spatial coordinate system is a position where the electronic device is enabled, the pose of the electronic device comprises values of the electronic at six dimensions of the current spatial coordinate system and is measured by a position sensor and an attitude sensor of the electronic device, the pose of the holographic content comprises values of the holographic context at six dimensions of the current spatial coordinate system, and the six dimensions comprises three-dimensional coordinates, a yaw angle, a roll angle, and a pitch angle;

obtaining difference information between a display area of a screen of the electronic device determined based on the pose of the electronic device and the pose of the holographic content;

adjusting the pose of the holographic content so that the holographic content is within the display area of the display screen of the electronic device when the difference information indicates that an average difference at a plurality of dimensions of the current spatial coordinate system is greater than a preset value;

obtaining a rendered holographic content by rendering the holographic content based on an adjusted pose;

upon obtaining a collection instruction, synthesizing the rendered holographic content and a real-world image currently collected by a first visual sensor in the electronic device to generate an image; and upon obtaining a photographing instruction, storing the generated image.

\* \* \* \* \*